Dec. 11, 1934.  G. WALTHER  1,984,048
METAL WHEEL
Filed Oct. 17, 1924   2 Sheets-Sheet 1
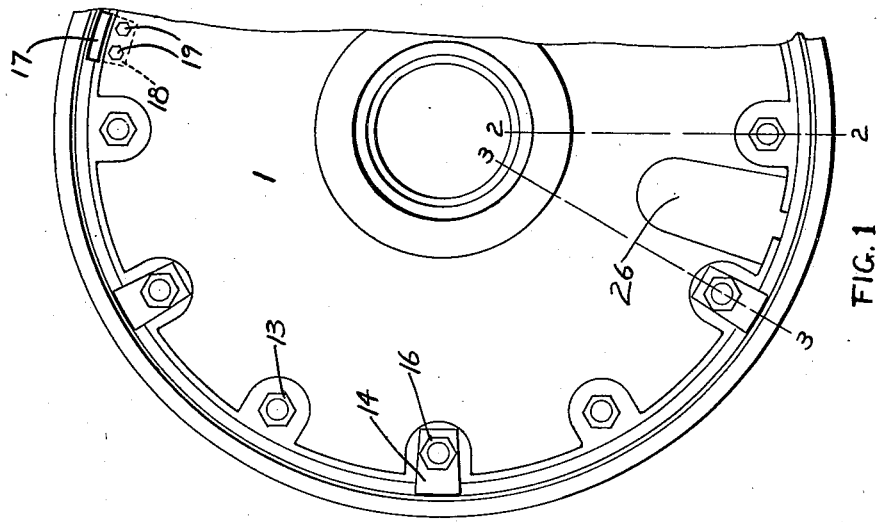
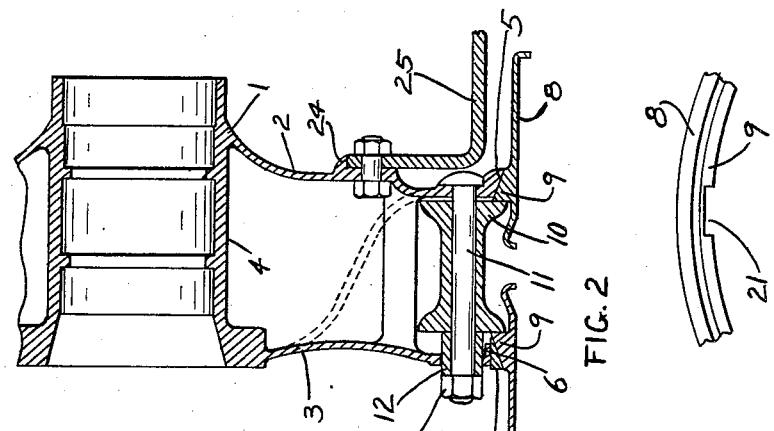
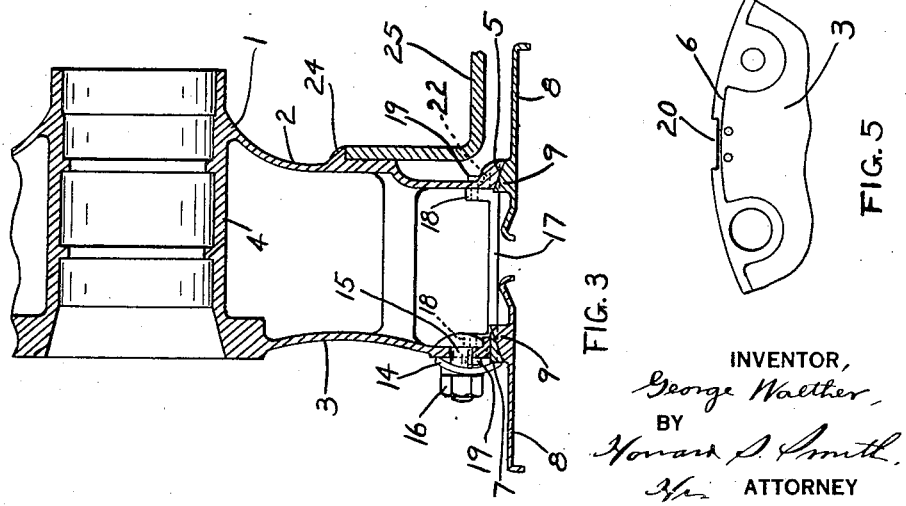

Dec. 11, 1934.                G. WALTHER                 1,984,048
                              METAL WHEEL
                     Filed Oct. 17, 1924      2 Sheets-Sheet 2
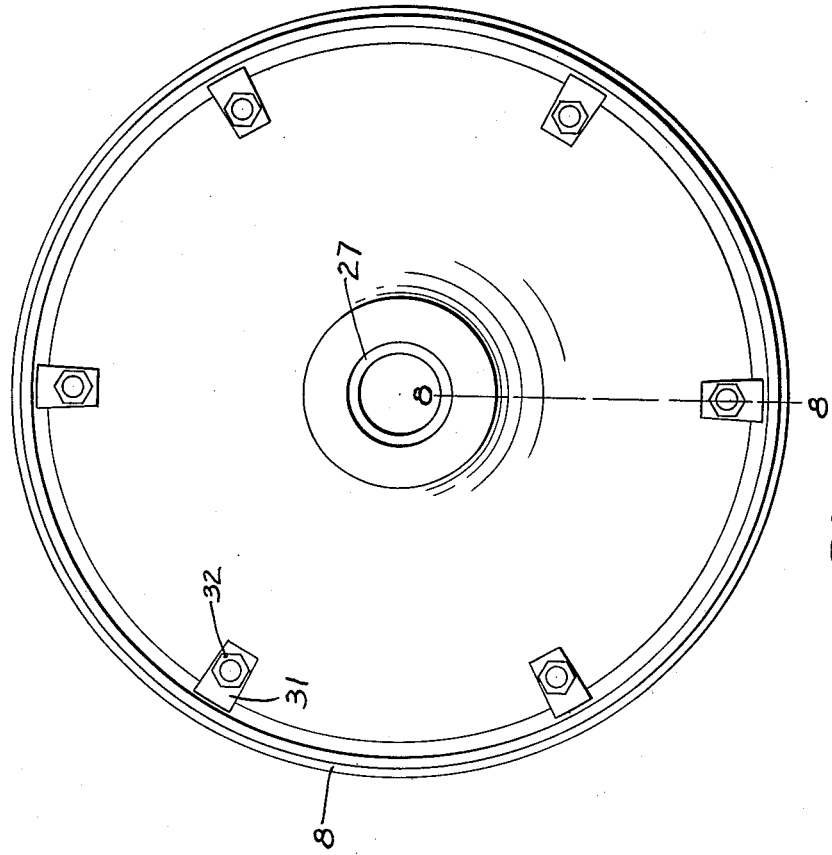
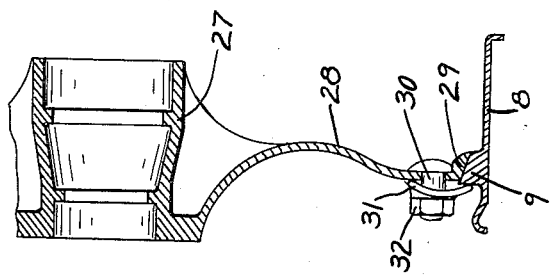
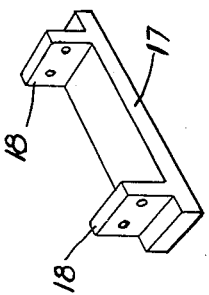
INVENTOR,
George Walther,
BY
Howard S. Smith,
His ATTORNEY Patented Dec. 11, 1934

1,984,048

UNITED STATES PATENT OFFICE 1,984,048

METAL WHEEL

George Walther, near Dayton, Ohio

Application October 17, 1924, Serial No. 744,139

10 Claims. (Cl. 301—13)

This invention relates to new and useful improvements in metal wheels, and more particularly to a dual pneumatic and a single pneumatic wheel with which a tire rim is interchangeable.

It is the principal object of my invention to provide for dual pneumatic service, a one-piece metal wheel whose inner disc is beveled toward the outer disc to receive a tire rim which is provided with a beveled flange that is off the center line of the tire. The second or outer tire rim is similar to the first, but has its beveled flange mounted on a movable wedge ring supported by the second or outer disc.

It is another object of my invention to keep both tires tight and in position by spacing and locking bushings through which pass bolts whose threaded portions extend through the outside disc to receive nuts that are more easily accessible for turning. In other words, the bolts, which are anchored in the back disc, pass through the spacer sleeves or bushings between the discs, to and through holes in the outer disc where nuts are easily applied to them. These bolts and nuts are of a common type so that they may be easily purchased for replacement when necessary.

It is another object of my invention to provide a one-piece single metal wheel with which the tire rims on the double one are interchangeable. This wheel has an extended hub portion which is formed with a single bevel facing outwardly which enables the tire rim to be solidly mounted on it without the employment of a wedge ring.

My invention results in a light metal wheel of the most substantial construction upon which a tire rim may be easily mounted. It also achieves economy in manufacture, and especially of maintenance since the bolts employed are those that anyone can buy for replacement when desired.

In the accompanying drawings, Figure 1 is a front view of my dual pneumatic type of metal wheel. Figure 2 is a cross sectional view taken on the line 2—2 of Figure 1, showing particularly the outward bevel on the inner disc and the spacing and backing sleeves or bushings between the discs. Figure 3 is a cross sectional view taken on the line 3—3 of Figure 1, showing the clamps for the wedge ring on the outer disc. Figure 4 is a detail view of that part of the tire rim which contains the driver receiving groove or slot in its beveled flange. Figure 5 is a detail view of that part of the outer disc which contains the driver receiving groove or slot. Figure 6 is a perspective view of the driving plate. Figure 7 is a front view of the one piece single metal wheel on which the tire rim may be mounted without the employment of a wedge ring. And Figure 8 is a cross sectional view taken on the line 8—8 of Figure 7, showing how the tire rim is solidly mounted on the outward bevel of the disc portion of the wheel.

Referring to the accompanying drawings for a detailed description of the forms of embodiment of my invention illustrated therein, the numeral 1 designates in Figures 1, 2 and 3 a metal wheel which is preferably constructed of steel and having an extended hub portion such as that provided by the discs 2 and 3 which are integral with its hub part 4. The inner disc 2, which comes over the hub bearing, is formed on its outer periphery with a bevel 5 that provides a solid circumferential support for the tire rim. This bevel 5 on the inner disc, faces the outer disc 3 which is formed on its outer periphery with an inwardly turned right-angled flange 6 for engagement by a wedge ring 7. (See Figures 2 and 3).

The numerals 8, 8 designate two similar tire rims, each of which is formed with a beveled flange portion 9 that is off the center line of the tire (not shown) which the rim receives. This beveled portion 9 is formed and located to engage the outwardly beveled periphery of the inner disc 2, and is held solidly against it by the means now to be described.

Referring to Figure 2, the numeral 10 designates a backing and spacing bushing or sleeve which flares outwardly at each end. These bushings are held at uniform distances apart around the wheel between the discs 2 and 3, by bolts 11 which pass through them. The heads of these bolts are anchored against the inner surface of the disc 2, and through holes in the latter they pass into and through the sleeves 10, and thence through short bushings 12. The latter bushings project through holes in the outer disc 3, so that there may be applied to the bolts 11 which pass through them, nuts 13 which thereby come on the outside of the disc 3 to make them easily accessible. These nuts and bolts are of a common type to facilitate their purchase for replacement when necessary.

After the beveled flange 9 on the inner tire rim 8 is brought in contact with the outwardly inclined bevel 5 on the inner disc 2, the sleeves 11 are turned to engage the shoulders formed at the outer ends of the flanges 9 on the tire rim. The nuts 13 are then screwed on the bolts 11 to exert a sufficient inward pressure upon the bushings 12 to press the sleeves 10 tightly against the flange 9 on the inner tire rim, thereby holding it solidly on the beveled periphery 5 of the disc 2 which is directly over the wheel bearing. The outward bevel 5 on the disc 2 thus becomes a solid circumferential support for the inner tire rim, and one which prevents the bearing from being twisted.

The outer tire rim 8 is mounted on the outer disc 3, with its beveled flange 9 inclining outwardly for engagement by the movable wedge ring 7. The latter is pressed between this flange 9 and the flange 6 on the outer periphery of the disc 3, by curved clamps 14. Formed in a circumferential series near the outer edge of the disc 3, are holes through which bolts 15 pass, with their heads anchored against the inner surface of the disc and their threaded ends projecting through the clamps 14 a sufficient distance to receive nuts 16 (see Figure 3). When these nuts are tightened, they will press the clamps against the wedge ring 7 to force it snugly between the flange 6 on the outer disc 3 and the beveled flange 9 on the outer tire rim 8, so that the latter will be solidly held on the outer disc. The bolts and nuts being on the outside of the disc 3, are accessible at all times for easy operation so that the tires may be readily mounted on, and demounted from, the wheel.

To prevent the tire rims 8, 8 slipping on the wheel discs, I have provided a suitable driving member such as the plate 17 shown in Figure 6. Formed on this plate, one near each end thereof, are two lugs 18, 18. One of the lugs is secured by screws 19 to the outer disc 3, and the other lug by similar screws to the disc 2, to hold the plate in a position, when the tire rims 8, 8 are applied, to cause its ends to enter registering slots or grooves in their meeting flanges. For instance, the outer end of the driving plate 17 will enter a slot 20 in the disc 3 and a registering slot 21 in the beveled flange of the outer tire rim 8, between the ends of the split wedge ring 7, while the inner end of said driving plate 17 will enter a slot 22 in the beveled portion of the inner disc 2 and the slot 21 in the inner tire rim 8. This driving plate 17 thus locks the discs 2 and 3 and their respective tire rims 8, 8 solidly together, so that one will not move on the other. (See Figures 3, 4, 5 and 6.)

The inner disc 3 is formed at its middle part with an enlarged annular portion 24 to which there is bolted or otherwise suitably secured, a brake drum 25. (See Figures 2 and 3.)

In each disc there is formed a suitable opening 26 through which the valve stems of the tires (not shown) are easily accessible.

In Figures 7 and 8 I have shown, for use on the front of the vehicle, a single pneumatic one-piece metal wheel upon which either one of the tire rims 8, 8 may be mounted. This wheel has a hub 27 with an integral disc or extension 28 which is formed with an outwardly beveled periphery 29. This beveled periphery is adapted to be engaged by the beveled flange 9 on the tire rim 8, and with which it is held in solid contact around its entire circumference without the employment of a wedge ring. The means I employ for this purpose comprise a number of bolts 30 which pass through a circumferential series of holes formed in the disc 28 near its outer edge. The head of each bolt is anchored against the inner surface of the disc, while its threaded portion projects through a curved clamp 31 to receive on its outer end a nut 32.

When the nuts 32 are tightened, they will press the clamps 31 firmly against the beveled flange 9 on the tire rim 8, to cause it to solidly engage the beveled periphery 29 of the disc, thereby holding the tire rim on the disc without the use of a wedge ring for the purpose. With the nuts on the outside of the disc, it is an easy matter to mount the tire rim on, and remove it from, the wheel. Furthermore, the bevel 29 on the disc 28, being directly over the hub bearing, provides a solid circumferential support for the tire rim and prevents the bearing from being twisted.

Having described my invention, I claim:

1. A metal wheel comprising a hub and hub extension, two tire rim seats on said extension, one of said seats being formed around its periphery with a single bevel, a tire rim on each seat, separate axial spacing members between said tire rims, and means passing through the axial spacing members for forcing said tire rims against said spacing members.

2. A metal wheel comprising a hub and hub extension, two tire rim supports on said extension, a tire rim free to be mounted upon each support, each tire rim formed with a beveled shoulder for mounting upon its respective support, a spacing element between said shoulders for endwise engagement by them, and having raised portions to engage under the rims to centralize their mounting upon the supports.

3. A metal wheel comprising a hub and two radial hub extensions, one hub extension being formed around its periphery with a raised-tire-rim supporting part, connecting members extending between said hub extensions, and spacing means co-operatively associated with said connecting members, between the raised tire-rim supporting part and the opposite hub extension.

4. A metal wheel comprising a hub and two radial hub extensions, one hub extension being formed around its periphery with a raised tire-rim supporting part, sleeves between said tire-rim supporting part and the other hub extension, and connecting members projecting through said sleeves from one hub extension to the other hub extension, for the purpose specified.

5. A metal wheel comprising a hub and two radial hub extensions, one hub extension being formed around its periphery with a single bevel which faces the other hub extension, a tire-rim formed with a beveled flange mounted on the single bevel of the first hub extension, said beveled flange terminating at one end in a shoulder, a similar tire-rim mounted on the other hub extension, and spacing means between the hub extensions, against which the shoulders on the beveled flanges of the tire rims abut.

6. A metal wheel comprising a hub and two radial hub extensions, one hub extension being formed around its periphery with a single bevel which faces the other hub extension, a tire-rim formed with a beveled flange mounted on the single bevel of the first hub extension, said beveled flange terminating at one end in a shoulder, a similar tire-rim mounted on the other hub extension, connecting members between the hub extensions, and spacing sleeves on said connecting members between the hub extensions, having flaring ends against which the shoulders on the beveled flanges of the tire rims abut.

7. A metal wheel comprising a hub and two radial disc portions, the inner disc portion being beveled around its outer periphery, toward the outer disc portion, a tire rim formed with a beveled flange which is mounted on the beveled part of the inner disc, a similar tire rim mounted on the outer disc portion, bolts passing from the inner disc portion through the outer one, spacing sleeves mounted on said bolts to engage the beveled flanges on the tire rims, means for pressing the beveled flange on the outer tire rim against the spacing sleeves, and means for forcing the later inwardly against the beveled flange on the inner tire rim for the purpose specified.

8. A metal wheel comprising a hub and two radial disc portions, the inner disc portion being beveled at its outer periphery, toward the outer disc portion, a tire rim formed with a beveled flange which is mounted on the beveled part of the inner disc portion, a similar tire rim mounted on the outer disc portion, bolts passing from the inner disc portion through the outer one, spacing sleeves mounted on said bolts to engage the beveled flanges on the tire rims, wedge-ring means for pressing the beveled flange on the outer rim against the spacing sleeves, bushings mounted on the bolts in front of said sleeves, and nuts applied to said bolts beyond the outer disc portion to engage, when tightened, said bushings to press the sleeves inwardly against the beveled flange on the inner tire rim, for the purpose specified.

9. A metal wheel comprising a hub and two radial disc portions, the inner disc portion being beveled around its outer periphery, toward the outer disc portion, a tire rim formed with a beveled flange which is mounted on the beveled part of the inner disc portion, a similar tire rim mounted on the outer disc portion, means for holding said tire rims on said disc portions, each disc portion and its respective tire rim formed with registering slots, and a driving plate secured to said disc portion for entrance, at its ends, into said registering slots.

10. A metal wheel comprising a hub and two radial disc portions, the inner disc portion being beveled around its outer periphery, toward the outer disc portion, a tire rim formed with a beveled flange which is mounted on the beveled part of the inner disc portion, a similar tire rim mounted on the outer disc portion, the beveled flange on each tire rim being formed with a slot, the outer periphery of each disc portion also being formed with a slot which registers with the slot in its respective tire rim, and a driving plate formed with lugs for attachment to the inner surfaces of the disc portions, with its ends free to enter the registering slots for the purpose specified.

GEORGE WALTHER.